United States Patent [19]

Krausse et al.

[11] Patent Number: 4,745,747
[45] Date of Patent: May 24, 1988

[54] HYDRAULIC SYSTEM FOR THE SUPPLYING OF HYDROSTATIC STEERING SYSTEM

[75] Inventors: Wolfgang Krausse, Lohr-Wombach; Norbert Mucheyer, Rechtenbach, both of Fed. Rep. of Germany

[73] Assignee: Mannesmann Rexroth GmbH, Fed. Rep. of Germany

[21] Appl. No.: 852,203

[22] Filed: Apr. 15, 1986

[30] Foreign Application Priority Data

Apr. 15, 1985 [DE] Fed. Rep. of Germany ........ 3513452

[51] Int. Cl.⁴ .............................................. F16D 31/02
[52] U.S. Cl. .......................................... 60/452; 60/422
[58] Field of Search ........................... 60/384, 422, 452

[56] References Cited

U.S. PATENT DOCUMENTS

| 4,335,577 | 6/1982 | Lobmeyer et al. | 60/422 |
| 4,336,687 | 6/1982 | Morgan | 60/422 |
| 4,400,937 | 8/1983 | Lobmeyer et al. | 60/452 |
| 4,401,009 | 8/1983 | Zenrer et al. | 60/452 |
| 4,470,259 | 9/1984 | Miller et al. | 60/422 |

FOREIGN PATENT DOCUMENTS 1570457 6/1976 United Kingdom .

*Primary Examiner*—A. Michael Chambers
*Attorney, Agent, or Firm*—Ostrolenk, Faber, Gerb & Soffen

[57] ABSTRACT

The invention concerns a hydraulic system for supplying a hydrostatic steering system. A central variable capacity hydraulic fluid pump supplies the steering system and a secondary consuming device via separate respective compensated pressure maintaining valves. The steering system and secondary consuming device are controlled by respective load report lines which are brought together at a changeover valve which is operative to permit the higher reported pressure to be delivered to a volume governor for the pump. Upon the secondary consuming device entering a neutral condition or a fluid loss condition, the changeover valve moves to block the load report line to the secondary consuming device; and a control circuit, including a branch line from the feed line to the steering system, maintains a higher pressure in the load report line of the steering hydraulic circuit than in the line of the secondary consuming device.

12 Claims, 1 Drawing Sheet

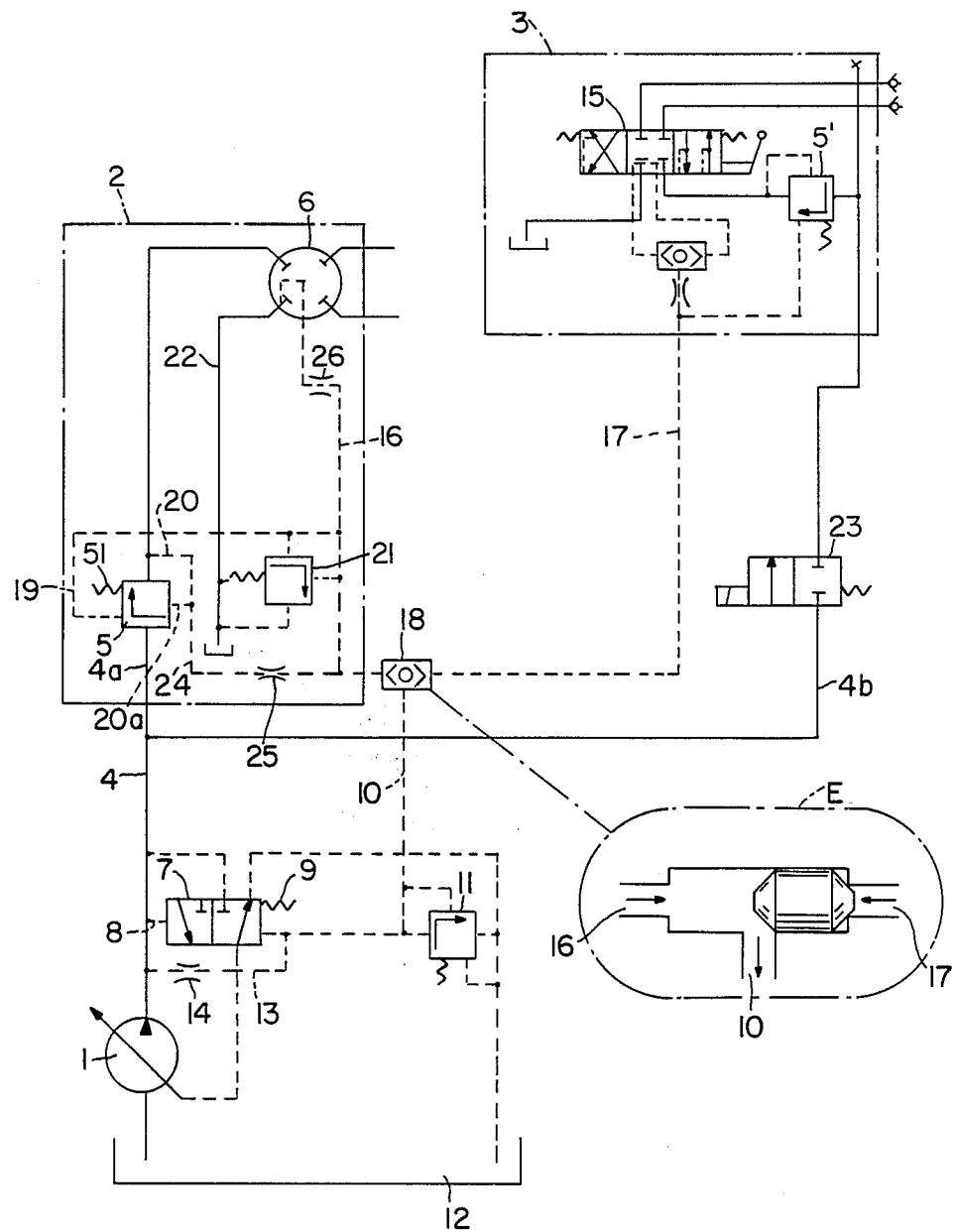

HYDRAULIC SYSTEM FOR THE SUPPLYING OF HYDROSTATIC STEERING SYSTEM

BACKGROUND OF THE INVENTION

The present invention refers to a hydraulic system for suppling a hydrostatic steering system and more particularly to such a hydraulic supply system which supplies both a steering system and secondary devices and controls delivery to assure it to the steering system.

Such hydraulic systems have been proposed for tractors in combination with load-sensing central hydraulic systems. Such a load-sensing system includes a central variable capacity pump, which assumes the entire task of supplying the fluid, and associated individual consuming devices, such as the steering and other secondary consuming devices, along with separate compensated pressure maintaining values. In each case, the valves adjust the supply pressure necessary for the respective consuming device. The compensated pressure maintaining valves are necessary, particularly since the individual consuming devices usually require different operating pressures and the variable capacity pump, whose supply volume and pressure are controlled via the load report lines, must provide the highest supply pressure required at the time. For this purpose, the load report lines are brought together at a changeover valve which transmits the highest load report line pressure in each case to the pump volume governor, for controlling the variable capacity pump.

To assure that the steering of the tractor remains operable at all times, a priority valve is ordinarily provided. It is constructed as a pressure maintaining valve (shown in Federal Republic of Germany OS No. 27 23 490). It can be arranged in the pressure-fluid line leading from the variable capacity pump to the secondary loads. For priority supply of the steering hydraulic circuit, the priority valve is switched from a regulating position into a switch position. This interrupts the connections with the secondary consuming devices, and then all of the fluid conveyed by the pump is conveyed into the steering hydraulic circuit. This produces a considerable improvement in the reliability of operation of the hydraulic system. However, if a leak should occur in the region of the secondary hydraulic circuit or system, the loss of fluid can become so great that the steering is endangered, since the priority valve is not able to recognize such a defect.

In order to increase the dependability of the steering, it has been proposed to incorporate a steering safety valve in the hydraulic circuit. The valve is actuated either electrically or hydraulically. It disconnects the hydraulic circuit of the secondary consuming devices in the event of the occurrence of the above noted defect, to prevent further loss of fluid.

This safety circuit considerably increases the reliablity of the operation of the steering circuit. However, in the event of a large leak, the loss of fluid via the load report line leading to the secondary circuit may still be so great that the steering is endangered.

SUMMARY OF THE INVENTION

The object of the present invention is to develop the hydraulic system for supplying the hydrostatic steering system such that the dependability in operation of the steering hydraulic circuit and of the steering is further increased, and by simple measures.

This object is achieved by a hydraulic system for supplying a hydrostatic steering system. The steering system includes a central variable capacity pump for pumping the hydraulic system. The hydraulic fluid operated steering system has a first fluid supply line supplying fluid to it from the pump. There is at least one secondary consuming device which is also operable by hydraulic fluid. A second fluid supply line from the pump supplies the secondary consuming device. The secondary consuming device has an operating condition at which it consumes the hydraulic fluid, a standby condition at which it is not operating and therefore does not consume the fluid at the same pressure level, and a disconnected condition at which it is disconnected from the second fluid supply line. An appropriate valve effects the disconnection. There are respective hydraulic pressure report lines connected with the steering system and with the secondary consuming device. A changeover valve is connected on two sides to the first and second report lines, respectively, to be moved by the higher pressure in one of the report lines to block the other lower pressure report line. The changeover valve communicates with a volume governor for the pump. There is a first respective compensated pressure maintaining valve in the first supply line for maintaining a first fluid pressure level in the steering system. There is a second compensated pressure maintaining valve in the second supply line which maintains a second fluid pressure level in the secondary consuming device. There is also a control device which is connected with the changeover valve for maintaining the changeover valve in the position which closes the second report line when the secondary consuming device is at a standby and/or at a disconnect condition.

According to the invention, the changeover valve is controlled so that it fulfills the additional function of a directional control valve. In the presence of selected operating conditions of the secondary hydraulic system, the control valve closes the load report line of the system. Since this load report line is usually continuously connected past a throttle point with the fluid supply line for improving the response behavior of the load sensing system, the invention dependably prevents a stream of leakage fluid from being conducted via the load report line to the leak. Loss of fluid through the leak is thus completely prevented after the response of the steering safety valve.

The control device that is connected with the changeover valve includes a branch control line that is connected between the pressure report line from the steering system and the first fluid supply line supplying the steering system. This connection to the fluid supply line is at a location downstream of the first pressure maintaining valve in that line.

The above control device keeps the expense for the switching and apparatus for controlling the changeover valve very small. The stream of fluid, which is branched off via the branch control line from the pressure supply line for the steering hydraulic circuit, maintains a predetermined low pressure in the load report line coming from the steering valve. This pressure is higher than the pressure in the load report line leading to the hydraulic circuit of the secondary load device. This assures reliable switching of the changeover valve into a position which closes the load report line of the secondary consuming device, even if the secondary consuming device had been operating before the occurrence of the leak at a higher pressure than the steering hydraulic circuit.

This development has the additional advantage that the switching of the changeover valve can take place without an additional source of energy. This not only reduces the cost of the construction of the hydraulic circuit. It also improves its reliability in operation. Ordinarily, a single additional bore in the housing of the steering circuit compensated pressure maintaining valve is sufficient in order to make the branch control line available.

The branch control line of the control device has a pressure control line for the pressure maintaining valve connected to it. The pressure maintaining valve in the supply line to the steering system includes a throttle slide which is moved to increase flow under the forces of a spring and a pressure in the pressure report line from the steering system against the pressure acting in the pressure control line.

An advantage of this development is that the switching of the changeover valve provides the possibility of also improving, by the above stated additional measure, the response behavior of the entire hydraulic system, and particularly of the steering-circuit compensated pressure maintaining valve. The branch control line, which has a given flow resistance together with the fluid pressure supply line and the steering circuit compensated pressure maintaining valve, form a two-way flow regulating valve which effects that the stream of fluid through the branch control line is maintained constant, independently of the pressure in the hydraulic pressure supply line coming from the variable capacity pump.

This manner of operation is particularly important for the neutral position of the steering valve, because in this position of the steering valve, the valve causes the compensated pressure maintaining valve of the steering hydraulic circuit to be open continuously by a certain amount. That amount is dependent upon the throttling action of the branch control line so that upon response of the steering, a stream of fluid is immediately available. This eliminates the time delay which would occur without the switching of the steering hydraulic circuit in accordance with the invention, until the steering circuit compensated pressure maintaining valve would be moved out of its closed position which it would assume in the neutral position of the steering valve, so that the response behavior is improved.

By placing a throttle in the branch control line, the prerequisite is created for the pressure which is to be maintained in the load report line of the steering hydraulic circuit to be adapted optimally to the entire system so that it operates with a minimum expenditure of energy.

The steering system includes a steering valve having an operative position and a neutral position. In the neutral position, the steering valve is connected to a return for pumped fluid, which removes the pumped fluid from the system. Furthermore, there is another pressure holding throttle in the report line from the steering system to the changeover valve. With the hydraulic circuit developed in this way, the stream of fluid through the branch control line can be adapted even more precisely to the entire system.

The pressure maintaining valve in the supply line to the steering system and another pressure maintaining valve in the secondary consuming device have respective springs that normally urge these maintaining valves to the position to transmit greater flow. The throttle in the branch control line and the throttle in the report line from the steering system are tuned to the springs of the pressure maintaining valves and to the volume governor. This assures that the drop in the regulating pressure at the volume governor and at the steering circuit compensated pressure maintaining valve to be adapted to each other so that the volume governor still responds slightly faster than the steering-circuit compensator or the steering-circuit compensated pressure maintaining valve and so that no coupling of negative effects occurs between the response behavior of the steering-circuit compensated pressure maintaining valve and of the volume governor.

BRIEF DESCRIPTION OF THE DRAWING

One embodiment of the hydraulic system according to the invention will be described below with reference to the drawing.

The drawing is a block diagram of a hydraulic system, for instance, for a tractor, which system is developed as a load-sensing central hydraulic system.

DESCRIPTION OF THE PREFERRED EMBODIMENT

A load sensing hydraulic system includes a central variable capacity pump 1 that supplies all hydraulic fluid consuming devices of the apparatus, such as a vehicle. For an agricultural tractor, these consuming devices are the steering circuit 2 and the secondary consuming device circuit 3. The hydraulic main line 4 leads away from the variable capacity pump 1 to the steering hydraulic circuit 2. Between the pump and circuit 2, the line 4 branches off into a steering pressure line 4a leading to the steering hydraulic circuit 2 and into a secondary consuming device pressure line 4b leading to the secondary-consuming device hydraulic circuit 3.

Each consuming device, i.e. both the steering circuit 2 and the secondary consuming device circuit 3, is provided with a separate, respective compensated, pressure maintaining valve 5, 5'. This assures that the individual consuming devices, which ordinarily require different amounts of fluid or fluid pressure, are supplied with the proper fluid pressure even if the central variable capacity pump provides a higher fluid pressure than any or all of the consuming devices require. The compensated pressure maintaining valve 5 is associated with the steering hydraulic circuit 2. The valve 5 is integrated into the steering circuit pressure line 4a upstream of a steering valve 6.

Control over the central variable capacity pump 1 is effected via a volume governor 7 which is developed as a 2-position, 3-connection-way valve. The governor 7 has a piston slide which is acted on, on the one hand, by a control pressure line 8 and, on the other hand, by a reference spring 9 and the pressure in a load report line 10. The illustrated position of the governor 7 shows when the system is operating properly, that is the pump is delivering to all consuming devices. In the shifted position of the governor where it has been shifted to the right in the FIGURE by the pressure in line 8, the governor causes the pump capacity to diminish until the pressures acting on the governor return it to its original position. The pressure in the load report line 10 can be limited via a pressure-limiting valve 11, which provides a return connection to the oil pan 12 when a limit pressure in the line 10 is exceeded.

For compensating for possible losses of fluid in the load report line 10, the hydraulic circuit has a bypass control line 13 in which a throttle 14 is incorporated. Therefore, the load report line 10 remains fully pressurized. From the steering valve 6 or the corresponding secondary-consuming device actuating valve 15, a steering circuit load report line 16, on the one hand, and a secondary-consuming-device load report line 17, on the other hand, extend to the opposite sides of a changeover valve 18. Valve 18 is of a known type and is shown in detail E is a springless slide-member valve. The changeover valve causes the higher pressure of the different pressures in the load report lines 16 and 17 to be fed via the load report line 10 to the piston of the volume governor 7 so that the central variable capacity pump 1 produces a flow volume and pressure which are adapted to the consuming devices having the greater requirement for fluid.

The steering-circuit compensated pressure maintaining valve 5 is developed as a throttle slide valve. On one side, the valve 5 is acted on by a reference spring 51 and by the pressure in a load-report control line 19. On the other side, that valve is acted on by the pressure in a steering-pressure control line 20. The load report steering-pressure line 19 is connected to the steering-circuit load report line 16. The limit pressure in line 16 can be adjusted via a pressure limiting valve 21, which is movable against a spring by the pressure in line 16 and the outlet from which is connected to a reservoir connection line 22 of the steering valve 6.

Comparable conditions are present in the region of the secondary-consuming-device hydraulic circuit 3, which also includes its own compensated pressure maintaining valve 5'.

In the FIGURE, the steering valve 6 is shown in its neutral position in which the steering-circuit load report line 16 is connected to reservoir, i.e. it is connected to the reservoir connection line 22.

The division of the stream of fluid conveyed by the central variable capacity pump 1 into the two main lines 4a and 4b is ordinarily accomplished through a priority valve, not shown, which sees to the priority supplying of the steering hydraulic circuit 2 if all of the hydraulic circuits can no longer be simultaneously supplied.

For further securing the steering hydraulic circuit 2, a steering safety valve 23 is incorporated in the pressure fluid line 4b leading to the secondary-consuming-device hydraulic circuit 3. This valve, which can be actuated electrically or hydraulically, assures that, in case of a threatened lack of oil brought about by a leak in the secondary-consuming-device hydraulic circuit 3, further loss of oil is prevented by disconnection of all secondary consuming devices. The steering safety valve 23 is shown in this blocking position in the drawing, which prevents flow via the pressure line 4b to the secondary consuming devices.

In case of the occurrence of a leak in the secondary-consuming-device hydraulic circuit 3, in order to prevent a further loss of fluid via the secondary-consuming-device load report line 17, the steering hydraulic circuit 2 has a throttling arrangement, which is a special additional control circuit for the changeover valve 18. From the load report line 16 of the steering hydraulic circuit 2, a branch control line 24 branches off from the changeover valve 18 and extends to the steering hydraulic circuit supply line 4a downstream of the compensated pressure maintaining valve 5. The branch control line 24 is connected to the control pressure line 20 of the compensated pressure maintaining valve 5. From the standpoint of switching technique, on the one hand, connection of the branch pressure line 24 to the supply line 4a of the steering hydraulic circuit is effected downstream of the compensated pressure maintaining valve 5. On the other hand, a throttle valve of the compensated pressure maintaining valve 5 is acted on via a pressure control line section 20a on the side opposite the reference spring 51.

A branch line throttle 25 is integrated into the branch control line 24. In addition, a pressure-holding throttle 26 is incorporated into the steering circuit load report line 16.

Operation of the circuit of the hydraulic system described above is now described.

If the secondary consuming devices 3 are either completely disconnected by the steering safety valve 23 (as shown in the FIGURE) or if these secondary loads are on standby operation, the secondary-consuming-device load report line 17 is practically unpressurized. At the same time, the steering-circuit load report line 16 is continuously supplied via the branch control line 24 and the branch line throttle 25 with a predetermined amount of fluid. In the neutral position of the steering valve 6, which is the position shown in the FIGURE, that fluid can flow only via the throttle 26 to the reservoir connection or the reservoir connection line 22. This assures that in the steering-circuit load report line 18, upon standby operation of the steering, a slightly higher pressure is always present in the load report line 16 than in the load report line 17. This assures that the changeover valve 18 always assumes a position closing the secondary consuming device report line 17, as shown in the detail E of the FIGURE, when the pressure in the secondary-consuming-device load report line 17 drops to the minimum value. That drop occurs either when the secondary consuming device passes into standby operation or else when the entire supply of the secondary loads is interrupted via the steering safety valve 23. The changeover valve 18 also assumes this position if, prior to the disconnection of the secondary consuming devices, a higher pressure prevailed in the secondary-consuming-device load report line 17 than in the steering-circuit load report line 16. The arrangement described above reliably prevents fluid from being lost through the load report line 17 if a leak occurs in the region of the secondary consuming devices.

The branch control line 24 together with the integrated branch line throttle 25, in cooperation with the control lines 19, 20 and 20a and with the reference spring 51 and the throttle slide of the compensated pressure maintaining valve 5 in the neutral position of the steering valve 6, forms a two-way flow regulator or regulating valve in which the measurement aperture is formed by the branch line throttle 25 and the piston slide is formed by the compensated pressure maintaining valve 5. That entire two-way flow regulating valve causes the stream of fluid through the branch line throttle 25 to remain constant independently of the pressure in the supply line 4, 4a coming from the variable capacity pump 1. This causes the compensated pressure maintaining valve 5 to always be open, i.e. even in the neutral position of the steering. Upon a response of the steering, a stream of fluid is thus immediately available. This has a favorable effect on the response behavior of the overall steering circuit, and particularly of the steering compensator and steering-circuit compensated pressure maintaining valve 5.

Upon disconnection of the secondary consuming devices, in the event that a higher pressure prevailed in the secondary-consuming-device load report line 17 than prevailed in the load report line 16, a shifting of the changeover valve 18 from the left-hand side open position into the right-hand side open position shown in detail E takes place. The speed with which this change takes place can be optimally adjusted in a simple manner by adaptation of the throttles 25 and 26.

Since the pressure which builds up in the steering-circuit load report line 16 due to the control circuit of the invention is at a relatively low level, it is normally not necessary to greatly change the adjustment of the reference springs 51 and 9 which already exist without the branch line 24 and the throttle 25. A new throttle connection of the steering hydraulic circuit described above therefore results in minimum expense for the retrofiting of a circuit which has already been proposed.

The invention thus provides a hydraulic system for supplying a hydrostatic steering system which is part of a load-sensing central hydraulic system, the latter system having a central variable capacity pump which supplies both the steering and also at least one additional secondary consuming device via separate compensated pressure maintaining valves. The system is controlled via load sensing or report lines of the steering circuit and of the secondary consuming devices. The load report lines are brought together at a changeover valve. To assure that upon the occurrence of a leak in the secondary-consuming-device hydraulic circuit, no loss of fluid occurs via the secondary-consuming-device load report line, a device maintains the changeover valve in a position which closes the load report line of the secondary consuming devices when the secondary consuming devices are disconnected, which is caused by a steering safety valve, and also when the secondary consuming devices are in the standby operation. Preferably, this is effected by a suitable control circuit which maintains a slightly higher pressure under the above-indicated operating conditions in the load report line of the steering hydraulic circuit than in the load report line of the secondary consuming devices.

Although the present invention has been described in connection with a preferred embodiment thereof, many variations will now become apparent to those skilled in the art. It is preferred, therefore, that the present invention be limited not by the specific disclosure herein, but only by the appended claims.

What is claimed is:

1. A hydraulic system for supplying a hydrostatic steering system, the hydraulic system comprising:
   a central variable capacity pump for pumping hydraulic fluid; the steering system being operable with hydraulic fluid; a first fluid supply line from the pump to the steering system;
   a secondary consuming device operable with hydraulic fluid; a second fluid supply line from the pump to the secondary consuming device; the secondary consuming device having an operating condition at which it consumes hydraulic fluid, a standby condition at which it does not consume the same pressure level of fluid it consumes in its operating condition, and a disconnected condition at which it is disconnected from the second fluid supply line;
   a steering system first consuming device hydraulic pressure report line carrying the pressure of the steering system; a second consuming device hydraulic pressure report line for the secondary consuming device and carrying the pressure of the secondary consuming device;
   a changeover valve connected on one side to the first report line and on another side to the second report line, and the changeover valve being movable by whichever of the first and the second report lines is reporting the higher pressure for blocking the other of the first and second report lines;
   a control device connected with the changeover valve for maintaining the changeover valve in the position which closes the second report line when the secondary consuming device is at a standby or at a disconnect condition;
   a volume governor for the pump for controlling the quantity of hydraulic fluid delivered to the first and second fluid supply lines by the pump, which is dependent upon the pressure at the volume governor; the changeover valve being connected with the volume governor for communicating the higher pressure reported by the unblocked report line to the volume governor for operating the volume governor for, in turn, controlling the quantity of hydraulic fluid in order to maintain a volume level set by the volume governor.

2. The hydraulic system of claim 1, wherein the control device comprises a branch control line that is connected between the first report line and the first fluid supply line.

3. The hydraulic system of claim 2, further comprising a throttle in the branch control line.

4. The hydraulic system of claim 1, further comprising a first compensated pressure maintaining valve in the first supply line for maintaining a first fluid pressure level in the steering system; a second compensated pressure maintaining valve in the second supply line for maintaining a second fluid pressure level in the secondary consuming device.

5. The hydraulic system of claim 4, wherein the control device comprises a branch control line that is connected between the first report line and the first fluid supply line at a location downstream in the first fluid supply line of the first pressure maintaining valve.

6. The hydraulic system of claim 5, further comprising a pressure control line connected to the branch control line; the first pressure maintaining valve including a throttle slide, which is moved to increase flow under the forces of a spring, a connection to the first report line against the pressure acting in the pressure control line.

7. The hydraulic system of claim 6, further comprising a throttle in the branch control line.

8. The hydraulic system of claim 7, further comprising a return for pumped fluid;
   the steering system further comprising a steering valve having an operative position and a neutral position, and in the neutral position, the steering valve being connected to the return for pumped fluid.

9. The hydraulic system of claim 8, further comprising a second pressure holding throttle in the first report line.

10. The hydraulic system of claim 9, further comprising respective first and second springs normally urging the first and the second pressure maintaining valves to transmit greater flow and the first mentioned and the second throttles being tuned to the first and second springs of the respective pressure maintaining valves and to the volume governor for maintaining a preset pressure to the steering system and the secondary consuming device.

11. The hydraulic system of claim 1, further comprising a return for pumped fluid;
the steering system further comprising a steering valve having an operative position and a neutral position, and in the neutral position, the steering valve being connected to the return for pumped fluid.

12. The hydraulic system of claim 11, further comprising a second pressure holding throttle in the first report line.

* * * * *